US009856329B2

(12) United States Patent
Boday et al.

(10) Patent No.: US 9,856,329 B2
(45) Date of Patent: Jan. 2, 2018

(54) FLAME RETARDANT MODIFIED CELLULOSIC NANOMATERIALS (FR-CNS) PREPARED USING PHOSPHORUS-CONTAINING MONOMERS

(71) Applicant: International Business Machines Corporation, Armonk, NY (US)

(72) Inventors: Dylan J. Boday, Tucson, AZ (US); Joseph Kuczynski, North Port, FL (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/399,619

(22) Filed: Jan. 5, 2017

(65) Prior Publication Data

US 2017/0114153 A1   Apr. 27, 2017

Related U.S. Application Data

(62) Division of application No. 14/226,103, filed on Mar. 26, 2014.

(51) Int. Cl.
*C08B 15/05* (2006.01)
*C08B 15/00* (2006.01)
(Continued)

(52) U.S. Cl.
CPC ............ *C08B 15/05* (2013.01); *C08B 3/00* (2013.01); *C08B 11/04* (2013.01); *C08B 11/187* (2013.01);
(Continued)

(58) Field of Classification Search
CPC ......... C08B 11/04; C08B 15/00; C08B 15/05; C08B 3/00; C08B 11/187;
(Continued)

(56) References Cited

U.S. PATENT DOCUMENTS 2,981,730 A   4/1961 Martin et al.
3,619,113 A   11/1971 Stockel et al.
(Continued)

FOREIGN PATENT DOCUMENTS

EP   2554588 A1   2/2013
JP   5150792 B2   2/2013

OTHER PUBLICATIONS

Hexion Inc. EPON 863 Technical Data Sheet (2016).*
(Continued)

*Primary Examiner* — Kregg T Brooks
(74) *Attorney, Agent, or Firm* — Matthew J. Bussan

(57) ABSTRACT

In accordance with some embodiments of the present invention, a composite material is prepared by blending a flame retardant modified cellulosic nanomaterial (FR-CN) filler into a polymer, wherein the FR-CN filler comprises a cellulosic nanomaterial (e.g., cellulose nanocrystals (CNCs) and/or cellulose nanofibrils (CNFs)) having a surface functionalized to incorporate a phosphorus-containing moiety. In some embodiments, the FR-CN filler is prepared by reacting hydroxyl groups on the surface of the cellulosic nanomaterial and a halogenated phosphorous-containing monomer (e.g., diphenyl phosphoryl chloride). In some embodiments, the surface of the cellulosic nanomaterial is further functionalized to incorporate an orthogonal functionality selected to enhance the compatibility of the FR-CN filler with the polymer by reacting hydroxyl groups on the surface of the cellulosic nanomaterial and a monomer (e.g., epichlorohydrin when the polymer is an epoxy-based polymer).

11 Claims, 2 Drawing Sheets

(51) Int. Cl.

| | | |
|---|---|---|
| C08L 63/00 | (2006.01) | |
| C08L 33/08 | (2006.01) | |
| C08L 1/00 | (2006.01) | |
| C08L 1/02 | (2006.01) | |
| C08L 1/04 | (2006.01) | |
| C08L 1/08 | (2006.01) | |
| C08L 1/26 | (2006.01) | |
| C08B 3/00 | (2006.01) | |
| C08B 11/04 | (2006.01) | |
| C08B 11/187 | (2006.01) | |
| C08L 33/16 | (2006.01) | |

(52) U.S. Cl.
CPC ............... *C08B 15/00* (2013.01); *C08L 1/00* (2013.01); *C08L 1/02* (2013.01); *C08L 1/04* (2013.01); *C08L 1/08* (2013.01); *C08L 1/26* (2013.01); *C08L 33/08* (2013.01); *C08L 33/16* (2013.01); *C08L 63/00* (2013.01); *C08L 2201/02* (2013.01); *C08L 2205/16* (2013.01)

(58) Field of Classification Search
CPC ... C08L 63/00–63/10; C08L 1/00; C08L 1/02; C08L 1/04; C08L 1/08; C08L 1/26; C08L 33/08; C09D 163/00–163/10; C09D 101/00; C09D 101/02; C09D 101/04; C09D 101/08; C09D 101/26; C09J 163/00–163/10; C09J 101/00; C09J 101/02; C09J 101/04; C09J 101/08; C09J 101/26; C09J 133/08; C08K 9/04; C08D 133/08

See application file for complete search history.

(56) References Cited

U.S. PATENT DOCUMENTS

| | | | |
|---|---|---|---|
| 3,734,684 A | 5/1973 | Donandson et al. | |
| 3,799,738 A | 3/1974 | Wagner | |
| 3,816,068 A | 6/1974 | Rivlin | |
| 3,865,618 A | 2/1975 | Daigle et al. | |
| 3,899,618 A | 8/1975 | Daigle et al. | |
| 3,982,410 A | 9/1976 | Getchell et al. | |
| 4,063,883 A | 12/1977 | Hupfl et al. | |
| 4,068,026 A | 1/1978 | Wagner | |
| 5,766,746 A | 6/1998 | Kampl et al. | |
| 9,040,682 B2 | 5/2015 | Boday et al. | |
| 2012/0040112 A1 | 2/2012 | Meldel et al. | |
| 2013/0345341 A1 | 12/2013 | Harada et al. | |
| 2015/0274848 A1 | 10/2015 | Boday et al. | |

OTHER PUBLICATIONS

U.S. Appl. No. 14/226,103, to Dylan J. Boday et al., entitled "Flame Retardant Modified Cellulosic Nanomaterials (FR-CNs) Prepared Using Phosphorus-Containing Monomers", filed Mar. 26, 2014, assigned to International Business Machines Corporation.

Dylan J. Boday et al., "Sustainable Materials for IT Applications", 2012 TAPPI International Conference on Nanotechnology for Renewable Materials, Jun. 5, 2012, 44 pages.

Dylan J. Boday, "Surface Modified Cellulose Nanocrystals for use as in Durable Good Applications", 2013 TAPPI International Conference on Nanotechnology for Renewable Materials, Jun. 25, 2013, 20 pages.

Lu et al., "Surface modification of microfibrillated cellulose for epoxy composite applications", Polymer, 49 (2008), pp. 1285-1296.

Ash et al., "Handbook of Preservatives" (2009), p. 240.

Syverud et al., "Cross-linking cellulose nanofibrils for potential elastic cryo-structured gels", Nanoscale Research Letters, (2011), 6:626, 6 pages.

Navarro et al. "Mercury removal from wastewater using porous cellulose carrier modified with polyethyleneimine", Wat. Res., vol. 30, No. 10, pp. 2488-2494 (1996).

Kiselev et al., "Cellulose phosphinates", Zhurnal, Plikladnoy Khimii, vol. XLVI, No. 4, pp. 909-914 (1973).

Imamoglu et al., "Photocuring of Acrylate Oligomers in the Presence of Vinyl Phosphonic Acids as a Flame Retarding Monomer and the Properties of the Cured Films", Turk. J. Chem, 25, pp. 1-9 (2001).

Vardanyan et al., "Mechanical properties of UV-waterborne varnishes reinforced by cellulose nanocrystals", J. Coat. Technol. Res., 11 (6), pp. 841-852 (2014).

* cited by examiner

FLAME RETARDANT MODIFIED CELLULOSIC NANOMATERIALS (FR-CNS) PREPARED USING PHOSPHORUS-CONTAINING MONOMERS

CROSS-REFERENCE TO RELATED APPLICATION

This patent application is a divisional application of pending U.S. patent application Ser. No. 14/226,103, filed Mar. 26, 2014, entitled "FLAME RETARDANT MODIFIED CELLULOSIC NANOMATERIALS (FR-CNs) PREPARED USING PHOSPHORUS-CONTAINING MONOMERS", which is hereby incorporated herein by reference in its entirety.

BACKGROUND

The present invention relates in general to the field of flame retardancy. More particularly, the present invention relates to flame retardant modified cellulosic nanomaterials (FR-CNs) prepared by modifying cellulose nanocrystals (CNCs) and/or cellulose nanofibrils (CNFs) using phosphorus-containing monomers.

SUMMARY

In accordance with some embodiments of the present invention, a composite material is prepared by blending a flame retardant modified cellulosic nanomaterial (FR-CN) filler into a polymer, wherein the FR-CN filler comprises a cellulosic nanomaterial (e.g., cellulose nanocrystals (CNCs) and/or cellulose nanofibrils (CNFs)) having a surface functionalized to incorporate a phosphorus-containing moiety. In some embodiments of the present invention, the FR-CN filler is prepared by reacting hydroxyl groups on the surface of the cellulosic nanomaterial and a halogenated phosphorus-containing monomer (e.g., diphenyl phosphoryl chloride). In some embodiments of the present invention, the surface of the cellulosic nanomaterial is further functionalized to incorporate an orthogonal functionality selected to enhance the compatibility of the FR-CN filler with the polymer by reacting hydroxyl groups on the surface of the cellulosic nanomaterial and a monomer (e.g., epichlorohydrin when the polymer is an epoxy-based polymer).

BRIEF DESCRIPTION OF THE SEVERAL VIEWS OF THE DRAWINGS

Embodiments of the present invention will hereinafter be described in conjunction with the appended drawings, where like designations denote like elements.

DETAILED DESCRIPTION

Figure 1:
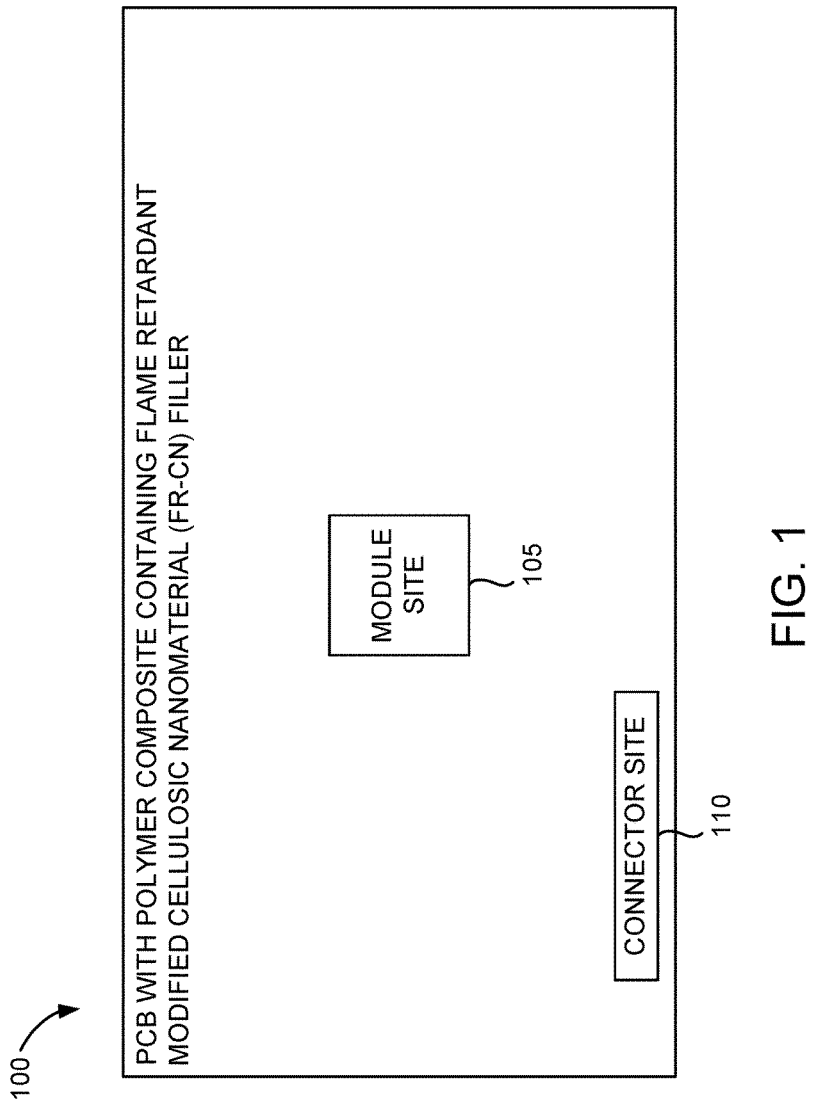
FIG. 1 is a block diagram illustrating an exemplary printed circuit board (PCB) having layers of dielectric material that incorporate a composite material having a flame retardant modified cellulosic nanomaterial (FR-CN) filler blended into a polymer in accordance with some embodiments of the present invention.

The use of synthetic polymers from petroleum sources is widespread. Petroleum-derived synthetic polymers, such as polycarbonate (PC) and acrylonitrile butadiene styrene (ABS), can be found in nearly every item we use in our daily lives. There is a growing shift to prepare polymeric materials from renewable feedstocks because petroleum is a finite resource. The use of these renewable polymers is envisaged in applications from disposable products to durable goods. Some bio-derived polymers are already being produced on a commercial scale (e.g., polylactic acid (PLA)). PLA is a good candidate to replace polycarbonates (PC) and PC blends (e.g., PC/ABS). Other bio-derived polymers, such as polyhydroxyalkanoate (PHA) and polybutylene succinate (PBS), are also good candidates. However, significant challenges must be overcome before renewable polymers find widespread use.

One of the main challenges facing renewable polymers is flame retardancy. Known renewable polymers and polymer blends containing renewable polymers typically do not retard burning. A common approach to render renewable polymers and blends containing renewable polymers as flame retardant is to incorporate flame retardant additives. Unfortunately, these flame retardant additives typically compromise the mechanical properties of the resulting composite materials.

Many applications require that components within systems be flame retardant in order to be used and must pass certifications such as those promulgated by UL (Underwriters Laboratories) or CSA (Canadian Standards Association). As polymers find more and more use in such systems, flame retardancy issues become a major challenge to overcome.

In the manufacture of PCBs, connectors, electronic device plastic enclosures and plastic enclosure panels, and other articles of manufacture that employ thermosetting plastics (also known as "thermosets") or thermoplastics, incorporation of a flame retardant is required for ignition resistance. Typically, brominated organic compounds impart flame retardancy. Consequently, the base material (e.g., epoxy resin for PCBs, and liquid crystal polymer (LCP) for connectors, and acrylonitrile butadiene styrene (ABS) for electronic device plastic panels and plastic enclosure panels) properties are compromised because a relatively large quantity of a flame retardant is necessary to achieve the desired ignition resistance.

In accordance with some embodiments of the present invention, flame retardant modified cellulosic nanomaterials (FR-CNs) are prepared by modifying cellulose nanocrystals/fibrils, which are renewable materials, to incorporate phosphorus-containing moieties. These FR-CNs (also referred to herein as "FR-CN filler") can be blended into polymers to generate flame retardant polymer composites.

Cellulosic nanomaterials (e.g., cellulose nanocrystals (CNCs) and/or cellulose nanofibrils (CNFs)) can be used as a filler to control the rheology of numerous formulations as well as the physical properties of composite materials incorporating them. Cellulosic nanomaterials are bio-derived (typically from trees, but may also be produced from other plants). Cellulosic nanomaterials are also referred to as nanocellulose. Generally, cellulosic nanomaterials have a diameter between 5 nm to 500 nm and a length between tens of nm to hundreds of µm. Many cellulosic nanomaterials are commercially available. Cellulosic nanomaterials may also be produced using techniques well known to those skilled in the art.

Cellulosic materials include, but are not limited to, CNCs and CNFs. CNCs and CNFs are also referred to herein as "cellulose nanocrystals/fibrils". CNCs and CNFs are two different colloidal forms of cellulose. CNCs and CNFs are prepared from pulp fibers, typically from trees. CNCs are typically prepared through acid hydrolysis of pulp fibers. CNCs are commercially available from suppliers such as CelluForce (Montreal, Canada). For example, CelluForce offers CNCs with specified average dimensions of 5 nm diameter and 100 nm length. CNFs are typically prepared through mechanical disintegration of pulp fibers. CNFs are commercially available from suppliers such as Rayonier Inc. (Jacksonville, Fla., USA) and Daicel FineChem Ltd. (Tokyo, Japan). The respective shape of CNCs and CNFs may be compared to "rice" and "spaghetti".

In accordance with some embodiments of the present invention, cellulose nanocrystals/fibrils are surface modified using a phosphorus-containing monomer. An example of a suitable phosphorus-containing monomer is diphenyl phosphoryl chloride. One skilled in the art will appreciate that any suitable phosphorus-containing monomer may be used in lieu of, or in addition to, diphenyl phosphoryl chloride.

Typically, the cellulose nanocrystals/fibrils are surface modified in an excess of the phosphorus-containing monomer. That is, a more than stoichiometric quantity of the phosphorus-containing monomer is typically used in synthesizing the FR-CN filler in order to react with all of the hydroxyl groups on the surface of the cellulose nanocrystals/fibrils. However, in accordance with some embodiments of the present invention, a less than stoichiometric quantity of the phosphorus-containing monomer may be used in synthesizing the FR-CN filler in order to leave some of the hydroxyl groups on the surface of the cellulose nanocrystals/fibrils available for adding an orthogonal functionality to tailor the FR-CN filler for blending into a polymer. Alternatively, a more than stoichiometric quantity of the phosphorus-containing monomer may be used, but the surface modification reaction terminated before completion in order to leave some of the hydroxyl groups on the surface of the cellulose nanocrystals/fibrils available for adding an orthogonal functionality to tailor the FR-CN filler for blending into a polymer.

The cellulose nanocrystals/fibrils and the phosphorus-containing monomer are typically reacted at an elevated temperature, followed by purification. Typically, the reaction proceeds without need for acid/base catalysts. However, a suitable catalyst may be employed. For example, the cellulose nanocrystals/fibrils and the phosphorus-containing monomer may be reacted in the presence of triethylamine (NEt$_3$) (also referred to as "Et$_3$N", "TEA" and "N,N-Diethylethanamine"), 4-dimethylaminopyridine (DMAP), and tetrahydrofuran (THF) to form the FR-CN filler. NEt$_3$ and DMAP are catalysts. THF is the solvent. One skilled in the art will appreciate that any suitable catalyst (proton acceptor) may be used in lieu of, or in addition to, NEt$_3$ and DMAP. For example, tri-n-butylamine (TBA) is also a suitable catalyst. Likewise, one skilled in the art will appreciate that any suitable solvent may be used in lieu of, or in addition to, THF. For example, dimethylformamide (DMF) and acetonitrile are also suitable solvents.

In accordance with some embodiments of the present invention, the resulting FR-CN filler can be blended into a polymer to render the composite flame resistant and improve the mechanical properties of the polymer due to the high aspect ratio the cellulose nanocrystals/fibrils provide. For example, FR-CN filler may be blended with one or more petroleum-derived polymers (e.g., epoxy resin, acrylonitrile butadiene styrene (ABS), and the like) and/or one or more conventional bio-derived polymers (e.g., polylactic acid (PLA), polyhydroxybutyrate (PHB), and the like). FR-CN filler can be, for example, blended into one or more polymers to impart flame retardancy to manufactured articles such as printed circuit boards (PCBs), connectors, electronic device plastic enclosures and plastic enclosure panels, and other articles of manufacture that employ thermosetting plastics or thermoplastics. The amount of FR-CN filler that is added to the polymer (i.e., also referred to herein as "FR-CN filler loading") can vary and is dependent on the mechanical properties desired and the amount of flame retardant needed per part generated. The resulting flame retardant composite material is more likely to pass agency certifications related to flame retardancy.

An exemplary synthetic procedure (Reaction Scheme 1) to modify CNCs with a phosphorus-containing FR functionality is illustrated below. In this particular exemplary synthetic procedure, a flame retardant cellulose nanocrystal (FR-CNC) is synthesized by modifying a CNC using diphenyl phosphoryl chloride. One skilled in the art will appreciate that a similar approach can be readily followed to synthesize other flame retardant cellulose nanocrystals (FR-CNCs) and/or flame retardant cellulose nanofibrils (FR-CNFs).

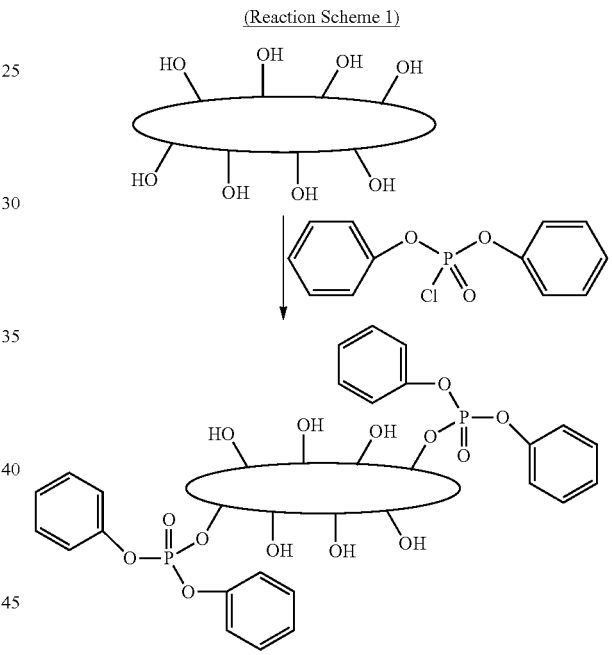

(Reaction Scheme 1)

In the exemplary synthetic procedure illustrated in Reaction Scheme 1, a FR-CNC is synthesized by reacting hydroxyl groups on the surface of a CNC with diphenyl phosphoryl chloride. Diphenyl phosphoryl chloride is a commercially available phosphorus-containing monomer and is a liquid at room temperature. This reaction is typically performed at an elevated temperature, without the need for acid/base catalysts. However, a suitable catalyst may be employed. Stoichiometric quantities of the reactants may be used. That is, a stoichiometric quantity of diphenyl phosphoryl chloride may be utilized to react with all of the hydroxyl groups on the surface of the CNC. On the other hand, it may be desirable to control the degree of FR functionalization of the CNC (e.g., in order to subsequently add an orthogonal functionality such as illustrated in Reaction Scheme 2, described below) by, for example, reacting less than the stoichiometric quantity of diphenyl phosphoryl chloride relative to the number of hydroxyl groups on the surface of the CNC.

The exemplary synthetic procedure to synthesize the FR-CNC illustrated in Reaction Scheme 1 is set forth for purposes of illustration and not limitation. For example, Reaction Scheme 1 synthesizes a particular FR-CNC by a solution-based condensation reaction of a particular cellulosic nanomaterial (i.e., CNC) and a particular phosphorus-containing monomer (i.e., diphenyl phosphoryl chloride). This particular synthesis of this particular FR-CNC is exemplary. More generally, a FR-CN filler in accordance with some embodiments of the present invention may be synthesized using a condensation reaction of any suitable cellulosic nanomaterial (e.g., CNC and/or CNF) and any suitable phosphorus-containing monomer.

Cellulosic nanomaterials suitable for reacting with a phosphorus-containing monomer via a condensation reaction to produce a FR-CN filler in accordance with some embodiments of the present invention may be either obtained commercially or synthesized. For example, suitable cellulosic nanomaterials that may be obtained commercially include, but are not limited to, CNCs and CNFs.

Phosphorus-containing monomers suitable for reacting with a cellulosic nanomaterial via a condensation reaction to produce a FR-CN filler in accordance with some embodiments of the present invention may be either obtained commercially or synthesized. For example, suitable phosphorus-containing monomers that may be obtained commercially include, but are not limited to, diphenyl phosphoryl chloride, diphenylphosphinic chloride, diethyl chlorophosphate, dimethyl chlorophosphate, diisopropyl chlorophosphate, chlorodiphenylphosphine, and combinations thereof. Generally, suitable phosphorus-containing monomers include, but are not limited to, phosphonic chlorides, chlorophosphates, alkyl/aryl phosphonates, or other phosphorus-containing monomers known for flame retardancy (e.g., phosphinates, phosphonates, phosphate esters, and combinations thereof).

Phosphonic chlorides and chlorophosphates are listed among the suitable phosphorus-containing monomers for purposes of illustration, not limitation. Suitable phosphorus-containing monomers may alternatively contain other halogen atoms or hydrogen atoms that participate in the condensation reaction in lieu of chlorine atoms.

Suitable phosphorus-containing monomers also include (or may be synthesized from) conventional phosphorus-based flame retardants, such as phosphonates (e.g., dimethyl methyl phosphonate; diethyl ethyl phosphonate; dimethyl propyl phosphonate; diethyl N,N-bis(2-hydroxyethyl) amino methyl phosphonate; phosphonic acid, methyl(5-methyl-2-methyl-1,3,2-dioxaphosphorinan-5-y) ester, P,P'-dioxide; and phosphonic acid, methyl(5-methyl-2-methyl-1,3,2-dioxaphosphorinan-5-yl) methyl, methyl ester, P-oxide), phosphate esters (e.g., triethyl phosphate; tributyl phosphate; trioctyl phosphate; and tributoxyethyl phosphate), and phosphinates.

A conventional phosphorus-based flame retardant typically includes one or more of a phosphonate, a phosphate ester, or a phosphinate. Conventional phosphorus-based flame retardants that are phosphonates have the following generic molecular structure:

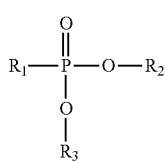

where $R_1$, $R_2$ and $R_3$ are organic substituents (e.g., alkyl, aryl, etc.) that may be the same or different.

Conventional phosphorus-based flame retardants that are phosphate esters have the following generic molecular structure:

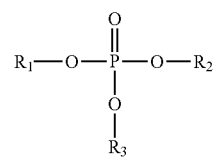

where $R_1$, $R_2$ and $R_3$ are organic substituents (e.g., alkyl, aryl, etc.) that may be the same or different.

Conventional phosphorus-based flame retardants that are phosphinates have the following generic molecular structure:

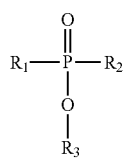

where $R_1$, $R_2$ and $R_3$ are organic substituents (e.g., alkyl, aryl, etc.) that may be the same or different.

One or more of the above conventional phosphorus-based flame retardants (i.e., phosphonate, phosphate ester, and/or phosphinate) and/or other conventional phosphate-based flame retardants may be functionalized (e.g., halogenated) using procedures well known to those skilled in the art to produce functionalized phosphorus-containing monomers suitable for reacting with a cellulosic nanomaterial via a condensation reaction to produce a FR-CN filler in accordance with some embodiments of the present invention. Hence, either halogen atoms of functionalized phosphorus-containing monomers or hydrogen atoms of the conventional phosphorus-based flame retardants may participate in the condensation reaction.

The reaction utilized in Reaction Scheme 1 to couple the phosphorus-containing moiety to the surface of the CNC may be replaced with any suitable coupling chemistry to couple any suitable phosphorus-containing moiety to the surface on any suitable cellulosic nanomaterial. For example, alkoxysilanes or chlorosilanes can be condensed on the surface of a cellulosic nanomaterial to yield a cellulosic nanomaterial containing numerous pendant phosphorus-containing groups. Cellulosic nanomaterial surfaces offer numerous possibilities for surface modification from which to choose a suitable coupling chemistry. For example, the surface of a cellulosic nanomaterial may be functionalized to contain a functional group such as isocyanate, vinyl, amine, or epoxy.

PROPHETIC EXAMPLE 1

Synthesis of FR-CNC Filler

To a 15 mL round bottom flask, 0.5 g of cellulose nanocrystals (CNCs) and 2 mL of diphenyl phosphoryl chloride are added along with a stir bar. The round bottom flask is then sealed with a septa and sonicated for 1 hour to disperse the cellulose nanocrystals in the excess of diphenyl phosphoryl chloride. In this example, a greater than stoichiometric quantity of the diphenyl phosphoryl chloride is used in order to react with all of the hydroxyl groups on the surface of the CNCs. After 1 hour, the round bottom flask is fitted with a condenser and purged with dry argon (Ar) gas. The round bottom flask is then heated in an oil bath for 24 hours at 75° C. After reaction, the reaction product is filtered and rinsed with tetrahydrofuran (THF) to remove excess diphenyl phosphoryl chloride. The reaction product (i.e., FR-CNC filler) is then dried overnight in vacuo.

In accordance with some embodiments of the present invention, the individual nanocrystals/fibrils may be dually modified with both the flame retardant functionality and an additional, orthogonal functionality that allows the FR cellulose nanocrystals/fibrils to be covalently bonded into a polymer matrix. This additional, orthogonal functionality allows for improved bonding within the polymer matrix.

Moreover, by adding this additional, orthogonal functionality, it is possible to "compatibilize" the FR-CN filler into whatever polymer matrix is chosen. That is, the FR cellulose nanocrystals/fibrils are further modified (i.e., "tailored") to incorporate an additional functionality that allows the FR cellulose nanocrystals/fibrils to be covalently bonded into a particular polymer matrix. Consequently, the FR-CN filler can be tailored for blending and bonding into a given polymer matrix. For example, addition of epichlorohydrin to the FR-CN filler in an appropriate concentration will condense epoxy functionality onto the cellulose nanocrystals/fibrils along with the phosphorus-containing FR functionality. Similarly, addition of methacryloyl chloride and/or acryloyl chloride to the FR-CN filler in an appropriate concentration will condense acrylate functionality onto the cellulose nanocrystals/fibrils along with the phosphorus-containing FR functionality.

An exemplary synthetic procedure (Reaction Scheme 2) to modify CNCs with both a phosphorus-containing FR functionality and an epoxy functionality is illustrated below. In this particular exemplary synthetic procedure, a FR-CNC is synthesized in the first step by modifying a CNC using diphenyl phosphoryl chloride, and then a tailored FR-CNC is synthesized in the second step by modifying the FR-CNC using epichlorohydrin. Hence, in the exemplary synthetic procedure illustrated in Reaction Scheme 2, the FR-CNC synthesized in the first step is further modified in the second step to tailor the FR-CNC for blending into an epoxy-based polymer matrix. One skilled in the art will appreciate that a similar approach can be readily followed to tailor the FR-CNC synthesized in the first step of Reaction Scheme 2 (or other FR-CNCs and/or FR-CNFs) for blending into a polymer matrix that is other than epoxy-based.

(Reaction Scheme 2)

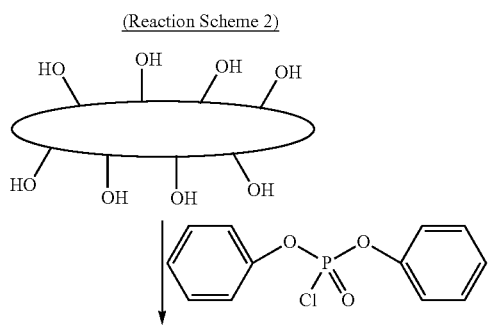

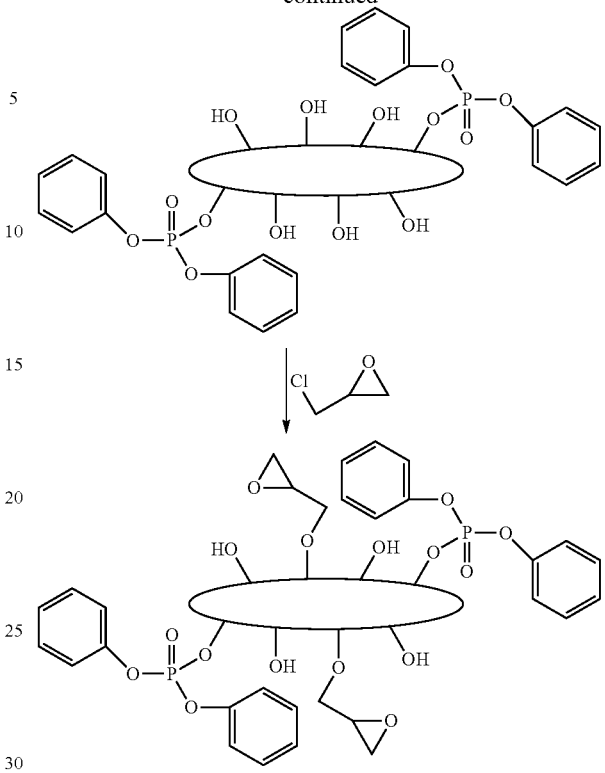

In the exemplary synthetic procedure illustrated in Reaction Scheme 2, a FR-CNC filler tailored for blending and bonding into an epoxy-based polymer matrix is synthesized using two-steps. In the first step of Reaction Scheme 2, a subset of the hydroxyl groups on the surface of a CNC are reacted with diphenyl phosphoryl chloride to produce an untailored FR-CNC. In the second step of Reaction Scheme 2, the remaining hydroxyl groups on the surface of the untailored FR-CNC are reacted with epichlorohydrin.

The first step of Reaction Scheme 2 is typically performed at an elevated temperature, without the need for acid/base catalysts. However, a suitable catalyst may be employed. In the first step of Reaction Scheme 2, the degree of FR functionalization of the CNC is controlled (i.e., in order to add an orthogonal functionality in the second step of Reaction Scheme 2) by, for example, reacting less than the stoichiometric quantity of diphenyl phosphoryl chloride relative to the number of hydroxyl groups on the surface of the CNC. With the exception of controlling the degree of FR functionalization of the CNC, the first step of Reaction Scheme 2 is identical to Reaction Scheme 1.

The second step of Reaction Scheme 2 is typically performed at an elevated temperature, without the need for acid/base catalysts. However, a suitable catalyst may be employed. Stoichiometric quantities of the reactants may be used. That is, a stoichiometric quantity of epichlorohydrin may be utilized to react with all of the remaining hydroxyl groups on the surface of the untailored FR-CNC. Epichlorohydrin is a commercially available epoxide and is a liquid at room temperature.

As noted above, a suitable catalyst may optionally be employed in the second step of Reaction Scheme 2. For example, the cellulose nanocrystals/fibrils and the epichlorohydrin may be reacted in the presence of triethylamine (NEt$_3$) (also referred to as "Et$_3$N", "TEA" and "N,N-

Diethylethanamine"), 4-dimethylaminopyridine (DMAP), and tetrahydrofuran (THF) to form the tailored FR-CN filler. NEt₃ and DMAP are catalysts. THF is the solvent. One skilled in the art will appreciate that any suitable catalyst (proton acceptor) may be used in lieu of, or in addition to, NEt₃ and DMAP. For example, tri-n-butylamine (TBA) is also a suitable catalyst. Likewise, one skilled in the art will appreciate that any suitable solvent may be used in lieu of, or in addition to, THF. For example, dimethylformamide (DMF) and acetonitrile are also suitable solvents.

The exemplary synthetic procedure to synthesize the tailored FR-CNC filler illustrated in Reaction Scheme 2 is set forth for purposes of illustration and not limitation. For example, Reaction Scheme 2 synthesizes a particular FR-CNC tailored for blending and bonding into an epoxy-based polymer matrix. This particular synthesis of this particular tailored FR-CNC is exemplary. More generally, a tailored FR-CN filler in accordance with some embodiments of the present invention may be synthesized using a condensation reaction of any suitable cellulosic nanomaterial (e.g., CNC and/or CNF) and any suitable "compatibilizing" monomer.

Suitable compatibilizing monomers for synthesizing a tailored FR-CN filler for blending and bonding into an epoxy-based polymer matrix include, but are not limited to, epichlorohydrin. Suitable compatibilizing monomers for synthesizing a tailored FR-CN filler for blending and bonding into an acrylate-based polymer matrix include, but are not limited to, methacryloyl chloride, acryloyl chloride, and combinations thereof. One skilled in the art will appreciate that myriad other suitable compatibilizing monomers may be used to tailor FR-CN fillers for blending with polymer matrices other than epoxy-based and acrylate-based.

PROPHETIC EXAMPLE 2

Synthesis of FR-CNC Filler Tailored for Blending and Bonding into an Epoxy-Based Polymer Matrix To a 15 mL round bottom flask, 0.5 g of cellulose nanocrystals (CNCs) and 0.5 mL of diphenyl phosphoryl chloride are added along with a stir bar. The round bottom flask is then sealed with a septa and sonicated for 1 hour to disperse the cellulose nanocrystals/fibrils in the diphenyl phosphoryl chloride. In this first step of this example, a less than stoichiometric quantity of the diphenyl phosphoryl chloride is used in order to leave some of the hydroxyl groups on the surface of the CNCs available for subsequently adding (in the second step of this example) an orthogonal functionality to tailor the FR-CNC filler for blending into an epoxy-based polymer matrix. After 1 hour, the round bottom flask is fitted with a condenser and purged with dry argon (Ar) gas. The round bottom flask is then heated in an oil bath for 24 hours at 75° C. After reaction, the reaction product is filtered and rinsed with tetrahydrofuran (THF) to remove unreacted diphenyl phosphoryl chloride. The reaction product (i.e., untailored FR-CNC filler) is then dried overnight in vacuo.

To a 15 mL round bottom flask, 0.5 g of the untailored FR-CNC filler synthesized in the first step of this example and 2 mL of epichlorohydrin are added along with a stir bar. The round bottom flask is then sealed with a septa and sonicated for 1 hour to disperse the cellulose nanocrystals/fibrils in the excess of epichlorohydrin. In this second step of this example, a greater than stoichiometric quantity of the epichlorohydrin is used in order to react with all of the remaining hydroxyl groups on the surface of the CNCs. After 1 hour, the round bottom flask is fitted with a condenser and purged with dry argon (Ar) gas. The round bottom flask is then heated in an oil bath for 24 hours at 75° C. After reaction, the reaction product is filtered and rinsed with tetrahydrofuran (THF) to remove excess epichlorohydrin. The reaction product (i.e., FR-CNC filler tailored for blending and bonding into an epoxy-based polymer matrix) is then dried overnight in vacuo.

In accordance with some embodiments of the present invention, a twin screw extruder, for example, may be used to blend the FR-CN filler into the polymer. The FR-CN filler may be tailored or untailored. One skilled in the art will appreciate that the FR-CN filler may be blended into the polymer using any suitable technique known to those skilled in the art.

The flame retardancy of the composite material depends on a number of factors including, for example, the FR-CN filler loading. One skilled in the art will appreciate, however, that additional factors beyond the flame retardancy of the composite material may figure into the determination of the amount of FR-CN filler to use in the composite material. Such additional factors include, for example, the rheology of composite material, as well as other physical properties of the composite material. Typically, the FR-CN filler loading will be within the range of 1% to 50%.

A FR-CN filler in accordance with some embodiments of the present invention may be blended with one or more petroleum-derived polymers (e.g., acrylonitrile butadiene styrene (ABS)) and/or one or more bio-derived polymers (e.g., polylactic acid (PLA), polyhydroxyalkanoate (PHA), polybutylene succinate (PBS), polyhydroxybutyrate (PHB), and the like) to increase the flame retardancy of the resulting composite material. The FR-CN filler may be tailored or untailored. For example, in accordance with some embodiments of the present invention, a FR-CN filler may be blended with a conventional sheet molding compound (SMC) (e.g., fiberglass reinforced epoxy) to increase the flame retardancy of the resulting composite material.

A FR-CN filler, in accordance with some embodiments of the present invention, may also serve to increase the renewable content in the resulting composite material (as compared to the use of conventional fillers).

An exemplary printed circuit board (PCB) implementation of the present invention is described below with reference to FIG. 1, while an exemplary connector implementation and an exemplary plastic enclosure panel implementation of the present invention are described below with reference to FIG. 2. However, those skilled in the art will appreciate that the present invention applies equally to any manufactured article that employs thermosetting polymers (also known as "thermosets") or thermoplastics.

FIG. 1 is a block diagram illustrating an exemplary printed circuit board (PCB) 100 having layers of dielectric material that incorporate a composite having a FR-CN filler in accordance with some embodiments of the present invention. The FR-CN filler utilized in the composite may be tailored or untailored. Each layer of dielectric material may, for example, comprise a composite material that includes a polymer, such as epoxy resin reinforced with fiberglass, and a FR-CN filler blended into the polymer. In the embodiment illustrated in FIG. 1, the PCB 100 includes one or more module sites 105 and one or more connector sites 110. The configuration of the PCB 100 shown in FIG. 1 is for purposes of illustration and not limitation.

In accordance with some embodiments of the present invention, each layer of dielectric material of the PCB 100 may, for example, comprise a composite material that includes a sheet molded compound (SMC) of fiberglass reinforced epoxy into which is blended a FR-CN filler.

Figure 2:
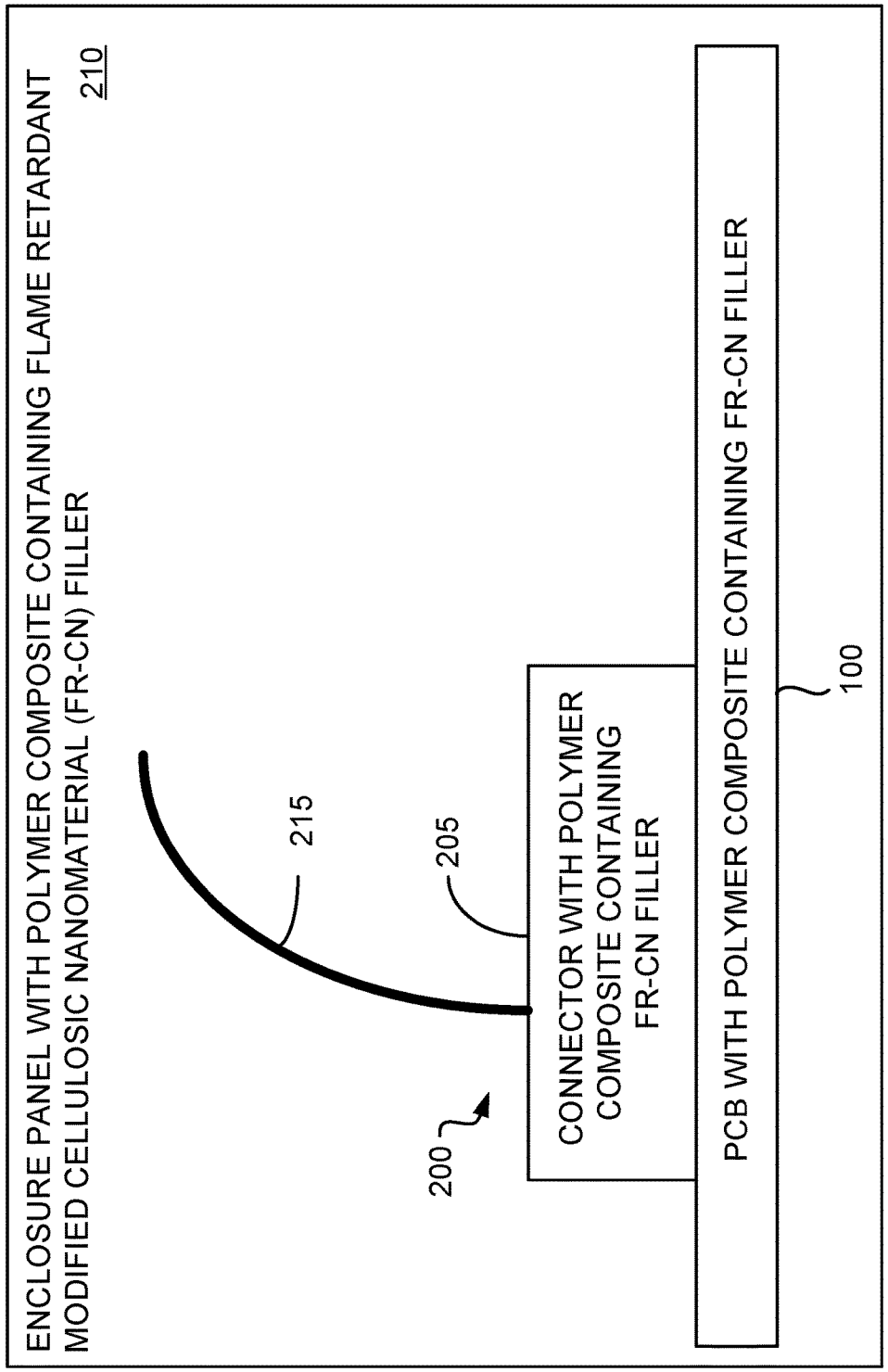
FIG. 2 is a block diagram illustrating an exemplary connector having a plastic housing and an exemplary plastic enclosure panel each of which incorporates a composite material having a flame retardant modified cellulosic nanomaterial (FR-CN) filler blended into a polymer in accordance with some embodiments of the present invention.

FIG. 2 is a block diagram illustrating an exemplary connector 200 having a plastic housing 205 and an exemplary plastic enclosure panel 210 that incorporate a composite having a FR-CN filler in accordance with some embodiments of the present invention. The FR-CN filler utilized in the composite may be tailored or untailored. In the embodiment illustrated in FIG. 2, the connector 200 is configured to make electrical contact with the connector site 110 (shown in FIG. 1) of the PCB 100. Also in the embodiment illustrated in FIG. 2, the connector 200 includes a cable 215. The configuration of the connector 200 and the configuration of the plastic enclosure panel 210 shown in FIG. 2 are for purposes of illustration and not limitation.

In accordance with some embodiments of the present invention, the plastic housing 205 of the connector 200 may, for example, comprise a composite material that includes a polymer, such as liquid crystal polymer (LCP), and a FR-CN filler blended into the polymer.

In accordance with some embodiments of the present invention, the plastic enclosure panel 210 may, for example, comprise a composite material that includes a polymer and a FR-CN filler blended into the polymer. The polymer may be any suitable petroleum-derived polymer and/or any suitable bio-derived polymer. Suitable petroleum-derived polymers include, but are not limited to, polycarbonates (PC), acrylonitrile butadiene styrene (ABS), and blends thereof. Suitable bio-derived polymers include, but are not limited to, polylactic acid (PLA), polyhydroxyalkanoate (PHA), polybutylene succinate (PBS), and blends thereof. Plastic enclosure panels are often referred to as "thermoplastic covers".

One skilled in the art will appreciate that many variations are possible within the scope of the present invention. Several embodiments of the present invention are described above in the context of exemplary applications (e.g., printed circuit boards (PCBs), connectors, and enclosure panels). However, the present invention is also applicable to other applications. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A method of making a flame retardant modified cellulosic nanomaterial, comprising the steps of:
   reacting a halogenated phosphorus-containing monomer and hydroxyl groups on the surface of a cellulosic nanomaterial selected from a group consisting of cellulose nanocrystals (CNCs), and cellulose nanofibrils (CNFs), and conbinations thereof;
   reacting hydroxyl groups on the surface of the cellulosic nanomaterial with a compatibilizing monomer selected to enhance the compatibility of the flame retardant modified cellulosic nanomaterial with a polymer into which the flame retardant modified cellulosic namomaterial is to be blended, wherein the compatibilizing monomer is selected from a group consisting of epichlorohydrin, methacryloyl chloride, acryloyl chloride, and combinations thereof.

2. The method as recited in claim 1, wherein the halogenated phosphorus-containing monomer is diphenyl phosphoryl chloride.

3. The method as recited in claim 1, wherein the halogenated phosphorus-containing monomer is diphenylphosphinic chloride.

4. The method as recited in claim 1, wherein the polymer is an epoxy-based polymer, and the compatibilizing monomer is epichlorohydrin.

5. The method as recited in claim 1, wherein the polymer is an acrylate-based polymer, and wherein the monomer is selected from the group consisting of methacryloyl chloride, acryloyl chloride, and combinations thereof.

6. A method of making a flame retardant modified cellulosic nanomaterial, the method comprising:
   reacting a halogenated phosphorus-containing monomer and hydroxyl groups on the surface of a cellulosic nanomaterial to functionalize a surface of the cellulosic nanomaterial to incorporate a phosphorus-containing moiety, wherein the cellulosic nanomaterial is selected from a group consisting of cellulose nanocrystals (CNCs), cellulose nanofibrils (CNFs), and combinations thereof, and wherein the halogenated phosphorus-containing monomer is selected from a group consisting of diphenyl phosphoryl chloride, diphenylphosphinic chloride, and combinations thereof;
   reacting a compatibilizing monomer and remaining hydroxyl groups on the surface of the cellulosic nanomaterial that remain after reacting the halogenated phosphorus-containing monomer and hydroxyl groups on the surface of the cellulosic nanomaterial to further functionalize the surface of the cellulosic nanomaterial to incorporate an orthogonal functionality selected to enhance the compatibility of the flame retardant modified cellulosic nanomaterial with a polymer into which the flame retardant modified cellulosic nanomaterial is to be blended, wherein the compatibilizing monomer is selected from a group consisting of epichlorohydrin, methacryloyl chloride, acryloyl chloride, and combinations thereof, and wherein the orthogonal functionality is separately appended to the surface of the cellulosic nanomaterial relative to the phosphorus-containing moiety.

7. The method as recited in claim 6, wherein the polymer is an epoxy-based polymer, and the compatibilizing monomer is epichlorohydrin.

8. The method as recited in claim 6, wherein the polymer is an acrylate-based polymer, and wherein the compatibilizing monomer is selected from the group consisting of methacryloyl chloride, acryloyl chloride, and combinations thereof.

9. A process of making a composite material, the process comprising:
   blending a flame retardant modified cellulosic nanomaterial into a polymer, wherein the flame retardant modified cellulosic nanomaterial is made by a method comprising:
      reacting a halogenated phosphorus-containing monomer and hydroxyl groups on the surface of a cellulosic nanomaterial to functionalize a surface of the cellulosic nanomaterial to incorporate a phosphorus-containing moiety, wherein the cellulosic nanomaterial is selected from a group consisting of cellulose nanocrystals (CNCs), cellulose nanofibrils (CNFs), and combinations thereof, and wherein the halogenated phosphorus-containing monomer is selected from a group consisting of diphenyl phosphoryl chloride, diphenylphosphinic chloride, and combinations thereof;

reacting a compatibilizing monomer and remaining hydroxyl groups on the surface of the cellulosic nanomaterial that remain after reacting the halogenated phosphorus-containing monomer and hydroxyl groups on the surface of the cellulosic nanomaterial to further functionalize the surface of the cellulosic nanomaterial to incorporate an orthogonal functionality selected to enhance the compatibility of the flame retardant modified cellulosic nanomaterial with the polymer, wherein the compatibilizing monomer is selected from a group consisting of epichlorohydrin, methacryloyl chloride, acryloyl chloride, and combinations thereof, and wherein the orthogonal functionality is separately appended to the surface of the cellulosic nanomaterial relative to the phosphorus-containing moiety.

10. The process as recited in claim 9, wherein the polymer is an epoxy-based polymer, and the compatibilizing monomer is epichlorohydrin.

11. The process as recited in claim 9, wherein the polymer is an acrylate-based polymer, and wherein the compatibilizing monomer is selected from the group consisting of methacryloyl chloride, acryloyl chloride, and combinations thereof.

* * * * *